3,240,800
FLUORINATED DIOL POLYESTERS
Wayne A. Severson, Hudson, Wis., assignor to Minnesota Mining and Manufacturing Company, St. Paul, Minn., a corporation of Delaware
No Drawing. Filed Aug. 26, 1964, Ser. No. 392,302
4 Claims. (Cl. 260—484)

This application is a continuation-in-part of my co-pending application, Serial Number 19,158, filed April 1, 1960, now abandoned.

This invention relates to a new and useful class of fluorinated polyesters and to polyester copolymers of 3,3'-oxybis (1,1-dihydrotetrafluoropropanol).

It is one object of the present invention to prepare a novel and useful class of polyesters.

It is another object of the present invention to provide novel polyesters of fluorinated diols.

Other objects of the invention will be apparent from the disclosure hereinafter set forth.

In accordance with the above and other objects of the invention it has been found that useful polyesters are obtained by employing perfluoroalkylene and perfluorooxaalkylene biscarbinols together with polycarboxylic acids.

One fluorinated diol employed in the present invention may be designated 4-oxa-2,2,3,3,5,5,6,6-octafluoroheptane-1,7-diol or alternatively as 3,3'-oxybis(1,1-dihydrotetrafluoropropanol), or as 3-oxaperfluoropentylene-1,5-biscarbinol, sometimes hereinafter termed "oxa-diol," and has the formula:

$$O(CF_2CF_2CH_2OH)_2$$

It is a water-white viscous liquid obtained by reduction of the diester of the corresponding acid; other perfluoroalkylene-α,ω-biscarbinols are described by McBee et al., J. Am. Chem. Soc., vol. 74, page 744d ref. (1952) and yet others can be prepared by analogous reductions of perfluorinated dioic acids. These biscarbinols are polymerized, as hereinafter disclosed, to form products which are highly inert and resistant to chemical attack and to thermal degradation. Certain rubbery polymers prepared from the fluorinated oxa-diol (particularly those which contain relatively large percentages thereof) also exhibit excellent low-temperature flexibility combined with good resistance to aromatic fuels, synthetic ester-base fuels and hydraulic fluids and retain their rubbery properties (as opposed to mere flexibility) at extremely low temperatures. Polyester-type polymers having these properties can be produced by copolymerizing the 3,3-oxybis(1,1-dihydrotetrafluoropropanol) with monomers containing a plurality of carboxyl groups (or derivatives thereof such as acyl halides, and acid anhydrides, etc.) together, if desired although not necessarily, with certain other comonomers such as other polyfunctional alcohols. The polyesters thus formed are themselves usually further polymerized, e.g., chain extended or crosslinked, and, in some cases compounded with fillers, pigments, anti-oxidants and the like, to produce ultimate cured resinous or rubbery products which are highly useful in critical applications such as fuel space and cabin sealants, gaskets, diaphragms, and structural adhesives in high-performance aircraft.

The polyesters of the invention may be widely varied from the point of view of individual constituents, molecular weight, degree of crosslinking, etc., but all may be characterized as the products resulting from the reaction of polyfunctional organic acids with polyfunctional alcohols and are so considered herein. Thus, the molecular weight of the polyesters formed by condensation, as disclosed herein, can vary from about 500 up to 150,000.

The polyfunctional-carboxylic acids which are copolymerized with fluorinated diols to produce polyesters of the invention can be characterized as polybasic organic acids in which the residue which is obtained by removing the carboxyl groups therefrom consists of an aliphatic, aromatic, or aliphatic-aromatic residue. One group of preferred organic acids is represented by the formula:

$$R—(COOH)_n$$

wherein R includes divalent aliphatic radicals having from about 4 to 53 carbon atoms, the 1,3-phenylene radical, the 1,4-phenylene radical and the 1,3,5-phenenyl radical; and $n$ is a number corresponding to the valency of R. A more preferable group of polybasic organic carboxylic acids is the group consisting of alkylene dicarboxylic acids of up to 16 carbon atoms, unsubstituted monocyclic aromatic polybasic acids of up to 10 carbon atoms and citric acid. The actual comonomers used in preparing the polyesters may be derivatives of polyfunctional acids, such as polyfunctional acid halides, anhydrides, dianhydrides, etc., since the linkages produced in the polyesters would be the same as though acids themselves were used.

Polyfunctional alcohols which can be used as comonomers with the fluorinated diol or oxadiol are unsubstituted, saturated acyclic organic polyols consisting of carbon, hydrogen and oxygen containing 2 or more terminal hydroxyl groups. The radical intervening between these terminal hydroxyl groups is an organic radical which bears no substituent functional groups containing active hydrogen atoms, and may be branched or linear aliphatic in nature. They may comprise polyether chains and are represented by the formula:

$$R'—(OH)_n$$

wherein R' includes polyvalent alkylene and oxaalkylene radicals and $n$ is a number corresponding to the valency of R'.

The following classes are illustrative of these polyesters.

(A) Polyesters prepared from polybasic acid together with the fluorinated diol. For instance, succinic acid, adipic acid, oxydipropionic acid, azelaic acid, sebacic acid, brassylic acid, thapsic acid, isophthalic acid, terephthalic acid, thiadipropionic acid, trimesic acid, citric acid, benzene tetracarboxylic acid, etc., as well as mixtures of 2 or more of them may be used together with the fluorinated diol to prepare polyesters of this type.

(M) Polyesters prepared from a polyfunctional alcohol, one or more dibasic acids and the fluorinated diol. Examples of these polyesters are reaction products of 3,3-oxybis(1,1-dihydrotetrafluoropropanol) with the following combinations: 1,4-butane diol and azelaic acid; diethylene glycol and azelaic acid; triethylene glycol and sebacic acid; polyethylene glycol-200 and adipic acid; polybutylene glycol-500 and adipic acid (the numbers following the word "glycol" referring to the molecular weight of the particular polyalkylene glycol); 1,1'-isopropylidenebis-(p-cyclohexanol) and succinic acid; 1,1-isopropylidenebis-(p-phenyleneoxy)di-2-propanol and adipic acid; bis-(4-hydroxyphenyl)-dimethylmethane and adipic acid; glycerol and succinic acid; trimethylolpropane and adipic acid; trimethylolpropane and diglycolic acid; trimethylolpropane and thiadipropionic acid; trimethylolethane and oxydipropionic acid; mannitol and diglycolic acid; pentaerythritol, sebacic acid and isophthalic acid; etc.

(C) Polyesters prepared from an acid having three or more carboxyl groups, one or more dibasic acids and the fluorinated diol. Some examples of polyesters of this type are: reaction product of 3,3'-oxybis(1,1-dihydrotetrafluoropropanol) with the following combinations of comonomers; trimesic acid and adipic acid; citric acid and adipic acid; citric acid, fumaric acid and sebacic acid; benzene tetracarboxylic acid and adipic acid; benzene tetracarboxylic acid and diglycolic acid; etc.

(D) Polyesters from excess of diol and one acid further reacted with the dianhydride of a tetrabasic acid such as: linear, hydroxyl-terminated polyesters of the fluorinated diol with adipic acid extended with pyromellitic dianhydride; fluorinated diol with diglycolic acid extended with 1,4,5,8-naphthalenetetracarboxylic dianhydride; and fluorinated diol and/or oxadiol with isophthalic acid extended with cyclohexanetetracarboxylic dianhydride.

Terms such as "polymerization" and "comonomers" are sometimes used herein relative to the formation of the polyesters of the invention to indicate esterification of the carboxylic- and hydroxyl-containing molecules to form the higher molecular weight products and not in the sense of addition polymerization.

Although it is possible in the formulation of polyesters comprising 3,3'-oxybis(1,1-dihydrotetrafluoropropanol) and other perfluoroalkylene bis-carbinols to use only relatively small amounts thereof, it has been found that if fewer than about half of the hydroxyl functional groups contained in the mixture of unreacted monomers thereof are furnished by the fluorinated diol, the resulting polymers do not effectively incorporate the valuable properties thereof. Therefore, it is preferred that at least about half of the hydroxyl functional groups contained in the mixture of unreacted monomers which are employed to produce the polyesters of the invention be furnished by the fluorinated diol.

The polyesters of the invention may be linear thermoplastic polymers solid at ordinary temperatures, but are more often obtained as liquid or substantially liquid, low to moderate molecular weight materials suitable for storage and subsequent further polymerization when admixed with curing agents to form solid rubbery or resinous materials. For this purpose, substantially-liquid polymers may be defined as those which have maximum viscosities in the temperature range of from about 25 to 50° C. of the order of about 10,000 poises when devoid of volatiles, and preferably have viscosities of less than 1,000 poises at 25° C. The term "liquid" as used herein with respect to the polymers of the invention will be understood as including polymers within this viscosity range.

The level of the active hydrogen concentration (ordinarily specified with respect to the content of hydrogen atoms reactive with the curing agent used) of the polyester as specified is ordinarily limited to from 0.1 to 3.0 milliequivalents per gram (the preferred range being 0.25 to 1.5 milliequivalents per gram), the rate of the reaction between the polyester and the curing agent depending upon the concentration of free reactive hydrogen atoms available. For example, in certain applications, a curing time of about 2 to 4 days is most desirable. A level of fewer than 0.1 milliequivalent per gram of active hydrogen concentration is practically inoperative to produce the desired result. On the other hand, if the upper active hydrogen concentration limit of 3.0 milliequivalents per gram is exceeded, control of the reaction may be lost, resulting in over-heating, charring, and even fire. The higher active hydrogen concentrations also reduce pot life or working time to an unfeasible minimum.

The liquid polyesters of the invention generally contain at least two functional groups per molecule which are reactive with the active functions of the curing agent in order to advance the cure so that solid materials are formed. In order to form solid thermoset resins, it is necessary to provide an average of more than two reactive functions per molecule on either the polyester or the curing agent. The term "thermoset" as used herein implies that the system under discussion falls within the gelation equation concept of Flory ("The Principles of Polymer Chemistry," P. J. Flory, Cornell Press, Ithaca, New York, 1953, pages 347 to 397).

Thus the polyfunctional organic acid-polyfunctional alcohol polyesters of the invention are preferably characterized by being substantially liquid at about 25° to 50° C. when devoid of volatiles (i.e. having a maximum viscosity of the order of about 10,000 poises), having an acid content ranging from about 0.1 to about 3 milliequivalents per gram, containing an average of more than 2 reactive hydrogen atoms per molecule reactive with the curing agent which is used and containing an amount of fluorinated diol or oxadiol, such as: 3,3'-oxybis(1,1-dihydrotetrafluoropropanol), sufficient so that at least about one half of the hydroxyl functional groups contained in the mixture of unreacted monomers used to prepare the polyester are furnished by that compound. An especially preferred group of these polyesters has viscosities of less than 1,000 poises at 25° C., and active hydrogen contents of from about 0.25 to about 1.5 milliequivalents per gram.

The liquid polymers may be conveniently formulated to end-use compositions as needed at ambient or at slightly elevated temperatures, i.e., of the order of 100° C. or below, with fillers, dyes, solvents, and the like, together with an appropriate curing agent. While still liquid the formulated resins may be coated on such surfaces as textiles, fabrics, metals, wood, leather, paper, synthetic rubber, cork, etc., to form protective and/or decorative coatings; impregnated into porous substrates such as paper, textile fibers, leathers, etc.; injected into grooves surrounding the fuel cavities of aircraft fuel tanks in order to insure leakproof and temperature resistant seals against hydrocarbon jet fuels as well as vapor pressure developed in the tank, resulting from aerodynamic heating during flight; utilized to seal aircraft pressurized cabins; fabricated as gaskets, diaphragms and O-rings; etc.

Among the curing agents suitable for curing liquid polyesters of the invention are compounds which contain a plurality of alkylenimine rings, e.g., polyfunctional alkylenamides as described in U.S. Patents 3,115,474 and 3,115,482, polyfunctional alkylencarbamates, polyfunctional alkylenureas and polyfunctional phosphonamides. Other suitable curing agents include isocyanates, epoxides, ketenes, acid chlorides, etc. Particular polyester and curing agent combinations are chosen to assure that the functional groups of each will react with those of the other in a manner consistent with the projected end use of the cured polymer, e.g., hydroxyl-terminated polyesters may be preferred with an isocyanate curing agent and carboxyl-terminated polyesters may be preferred with an epoxide curing agent. The polyfunctional alkylenamides which are the curing agents preferred for use with the polyesters of the invention (as more fully disclosed hereinafter) are reactive with the unreacted carboxylic groups in the liquid polyesters as well as unreacted hydroxyl groups therein furnished by the fluorinated diol and/or oxadiol. These carbinol hydroxyl groups are apparently rendered reactive with the polyfunctional alkylenamides by the fluorine atoms on the carbon atom alpha to the carbinol group. Hydroxyl groups in compounds which contain no fluorine, or in which at least three carbon atoms intervene between the hydroxyl function and the nearest fluorine atom, are in general not reactive with the polyalkylenamides.

It has been found that the liquid polyesters of the invention are usually somewhat higher in effective functionality (i.e. active hydrogen content) than would be expected on the basis of the comonomers added. This heightened functionality often exceeds the expected value by as much as 10 percent or more. The exact causes of this phenomenon are somewhat obscure, although they may result from the production of additional active hydrogen by interaction of impurities with the polyester or curing agents used, by side reactions such as hydrolysis, the occasional formation of crosslinks between polymer chains through interreaction of two curing agent molecules, etc. Regardless of the exact causes of this phenomenon, which in no way limits the scope of the present invention, it is generally found that polyesters of the invention which would be expected from their monomeric constitution to contain an average of only 1.8 active hydrogen atoms per molecule (and in some cases a slightly smaller average value) react with difunctional chain extenders, e.g. the polyfunctional alkylenamides to form fully cured solid polymeric systems.

The following examples illustrate the preparation of polyesters of the invention and further exemplify the preparation of a fluorinated oxa-diol useful in polyesters of the invention and of valuable elastomeric products obtained from polyesters of the invention. In the examples all parts are by weight unless otherwise specified.

*Example 1*

Ethyl perfluoro-oxydipropionate

is prepared by refluxing 14.2 parts of perfluorooxydipropionic acid (the preparation of which is disclosed in U.S. Patent No. 2,839,513), 137 parts of ethanol and 260 parts of benzene continuously removing water as the ternary azeotrope. After completion of esterification, excess solvent is removed and ethyl perfluorooxydipropionate is recovered as a liquid boiling at about 75° C. at 3.5 mm. Hg pressure.

One hundred and eighty-one parts (0.5 mol) of ethyl perfluorooxydipropionate are added slowly to a stirred solution of 38 parts of sodium borohydride in 500 parts by volume of tetrahydrofuran in a suitable vessel. The rate of addition is adjusted to maintain the temperature of the reaction mixture at about 45–50° C. After agitating for about 1.5 hours and refluxing for a further 2 hours (ca. 67° C.), the mixture is cooled to room temperature, acidified with 60 ml. of 20 percent sulfuric acid, and worked up to give 3,3'-oxybis(tetrafluoropropanol) as a viscous water-white liquid boiling at 84° to 86° C. at 2 mm. Hg pressure.

*Analysis.*—Calculated for $C_6H_6O_3F_8$: 25.9% C; 54.7% F. Found: 26.0% C; 54.1% F.

About 16.2 parts of redistilled adipoyl dichloride and 24.58 parts of redistilled 3,3'-oxybis(tetrafluoropropanol) (slightly over an equimolar amount) are charged to a flask fitted with a thermometer, a gas addition tube and a water cooled condenser using diethyl ether to rinse the materials into the flask. Nitrogen is passed through reaction mixture and heat is gradually applied until the ether is removed; after which cooling water is passed through the condenser and the rate of heating is gradually increased until, after about 70 minutes, the reaction mixture has reached 150° C. This temperature is maintained thereafter and after a total reaction time of approximately 3½ hours the off-gases are free from hydrogen chloride indicating completion of the reaction. Residual dissolved gases are removed at 100 mm. Hg pressure.

The resulting polyester of the invention is an extremely viscous liquid which does not solidify upon cooling. It is characterized as follows:

| | |
|---|---|
| No. of active hydrogen atoms per molecule | 2 |
| Active hydrogen content (milliequivalents per gram) | .12 |
| Equivalent weight per active hydrogen | 8,350 |
| Molecular weight (determined from neutralization equivalent) | 16,700 |

The acid chloride end groups of this polyester hydrolyze to carboxyl groups upon contact with traces of water in curing agents or other reactants. The hydrolysis also takes place over a period of time if stored in contact with moist air. Thus, the acid chloride end groups in this and similar polyesters are ordinarily considered as carboxyl groups with respect to further polymerization with curing agents.

A polyester of the invention is prepared in bulk by charging 3,3' - oxybis(1,1 - dihydrotetrafluoropropanol), adipic acid and glycerol to a stirred flask in the molar ratio of 0.8:1.0:0.1 and reacting them at 160–180° C. in a nitrogen atmosphere. The water of esterification is removed by distillation. The pot-residue is a viscous polyester of the invention.

In another preparation, the fluorinated oxa-diol, azelaic acid and trimethylolpropane are charged to a flask in the molar ratio of 0.5:1.0:0.1 together with a small amount of paratoluenesulfonic acid and benzene solvent, the flask being equipped with a Dean-Starke water-separator and condenser. This mixture is heated at reflux until the theoretical amount of water has been removed. Excess benzene is removed to give the viscous polyester.

Similarly, other polyesters according to the invention are prepared by azeotropic or bulk techniques as described hereinabove by esterifying separately and in combination the above fluorinated oxadiol, perfluoroethylene biscarbinol and perfluorobutylene biscarbinol with polyfunctional acidic reactants such as those listed hereinbefore under the categories A, B, C and D.

*Example 2*

The linear polyester of adipic acid and the fluorinated diol of the preceding example is easily chain extended by the compound N,N'-bis-1,2-ethylenisosebacamide of the following formula:

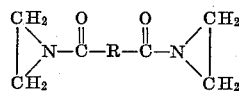

wherein R represents the divalent group occurring between the carboxyl groups of "isosebacic acid" (a product of the U.S. Industrial Chemical Company consisting of about 72 to 80 percent of 2-ethylsuberic acid, 12 to 18 percent of 2,5-diethyladipic acid and 6 to 10 percent of n-sebacic acid).

About 98.0 parts of the above polyester are dissolved in 900 parts of chloroform and 6.72 parts of N,N'-bis-1,2-ethylenisosebacamide are added at room temperature. The chloroform is removed by evaporation and the polymer is deposited as a film on an aluminum surface. The resulting film is cured for 105 minutes at 120° C. to produce a solid rubber. 80.0 parts of this rubber are mixed with 4 parts of dicumyl peroxide in a rubber mill and the resulting milled stock is cured for 30 minutes at 310° F. to form a snappy rubber.

The polyesters of 3,3'-oxybis(1,1-dihydrotetrafluoropropanol) with adipic acid and glycerol and with azelaic acid and trimethylolpropane shown above also cure smoothly with N,N'-bis-1,2-ethylenisosebacamide to form tough, snappy rubbers. More generally, the polyesters of the invention comprising separately or in combination 3-oxaperfluoropentylene biscarbinol, perfluoroethylene biscarbinol or perfluorobutylene biscarbinol with polyfunctional acidic reactants of illustrative categories A, B. C and D cure with N,N'-bis-1,2-ethylenisosebacamide and others of the polyfunctional alkylenamides to form useful rubbery or resinous materials.

*Example 3*

Approximately equal parts by volume of monomeric 3,3'-oxybis(1,1-dihydrotetrafluoropropanol) and N,N'-bis-1,2-ethylenisosebacamide are mixed at room temperature, no reaction being apparent. No significant change takes place in the liquid mixture while heating for 10 minutes at 120° but it forms a light yellow rubber during an additional cure of 15 minutes at 340° F. This rubber is not soluble in either methylethylketone or toluene thus indicating a cured and crosslinked system. Similar results are obtained employing other polyesters of the invention.

Example 4

About 51.6 parts of the polyester of adipic acid and the fluorinated oxadiol of Example 1 are mixed with 2.82 parts of N,N'-bis-1,2-ethylenisosebacamide according to the procedures used in Example 4. The resulting film is cured for 75 minutes at 120° C. to form a crosslinked rubber having the following properties:

| | |
|---|---|
| Tensile strength, p.s.i.[1] | 66 |
| Elongation, percent [1] | 180 |
| Set at break, percent [1] | 0 |
| Gehman $T_{10}$, ° F. (ASTM D1053–54T) | −40 |
| Brittle point, $T_B$, ° F. | −72 |
| Volume swelling, percent (ASTM D471–55T) 70:30 isooctane: toluene, 48 hrs. at 77° F. | 30 |

[1] Tensile strength, elongation and set at break are measured using dumbell-shaped specimens 0.125″ wide, 0.080″ thick and 0.5″ between bench marks at a jaw separation rate of 2 inches per minute. Test values correlate with those from ASTM D412–51T.

It is found to be impossible to redissolve this crosslinked rubber in chloroform by submerging it for 10 days at room temperature.

What is claimed is:

1. A polyester having a molecular weight from about 500 up to 150,000 consisting essentially of at least one polybasic organic carboxylic acid, selected from the group consisting of alkylene dicarboxylic acids of up to 16 carbon atoms, unsubstituted monocyclic aromatic polybasic acids of up to 10 carbon atoms and citric acid, esterified with at least one polybasic organic alcohol; said polyester having an active hydrogen content in the range of about 0.1 to 3 milliequivalents per gram and an average of at least 2 active hydrogen atoms per molecule; at least about one half of the hydroxyl functionality of said polybasic organic alcohol being furnished by 3,3'-oxybis(1,1-dihydrotetrafluoropropanol) and the remainder of the hydroxyl functionality thereof being furnished by at least one unsubstituted saturated polyhydric acyclic alcohol consisting of carbon, hydrogen and oxygen.

2. A polyester having a molecular weight from about 500 up to 150,000 consisting essentially of at least one alkylene dicarboxylic acid of up to 16 carbon atoms esterified with 3,3-oxybis(1,1-dihydrotetrafluoropropanol).

3. A polyester having a molecular weight from about 500 up to 150,000 consisting essentially of at least one unsubstituted monocyclic aromatic polybasic acid of up to 10 carbon atoms esterified with 3,3'-oxybis(1,1-dihydrotetrafluoropropanol).

4. A liquid linear polyester having a viscosity at 25° C. of less than 1000 poises consisting essentially of adipic acid esterified with 3,3'-oxybis(1,1-dihydrotetrafluoropropanol).

References Cited by the Examiner

UNITED STATES PATENTS

| | | | |
|---|---|---|---|
| 2,839,513 | 6/1958 | Albrecht | 260—615 |
| 2,902,473 | 9/1959 | Smith | 260—75 |
| 3,016,360 | 1/1962 | Schweiker et al. | 260—75 X |
| 3,016,361 | 1/1962 | Schweiker et al. | 260—75 X |
| 3,044,988 | 7/1962 | Ottmann | 260—75 |

OTHER REFERENCES

Filler et al.: "Journ. of the American Chem. Soc.," vol. 75, pp. 2693–2695, June 5, 1953, QD 1.A5.

WADC Technical Report 55–221, part IV; ASTIA Document No. 151,009, "Investigation of Condensation Type Elastomers," Schweiker et al., February 1958, pp. IV, V, and 1–24.

WILLIAM H. SHORT, *Primary Examiner.*

LOUISE P. QUAST, *Examiner.*